UNITED STATES PATENT OFFICE.

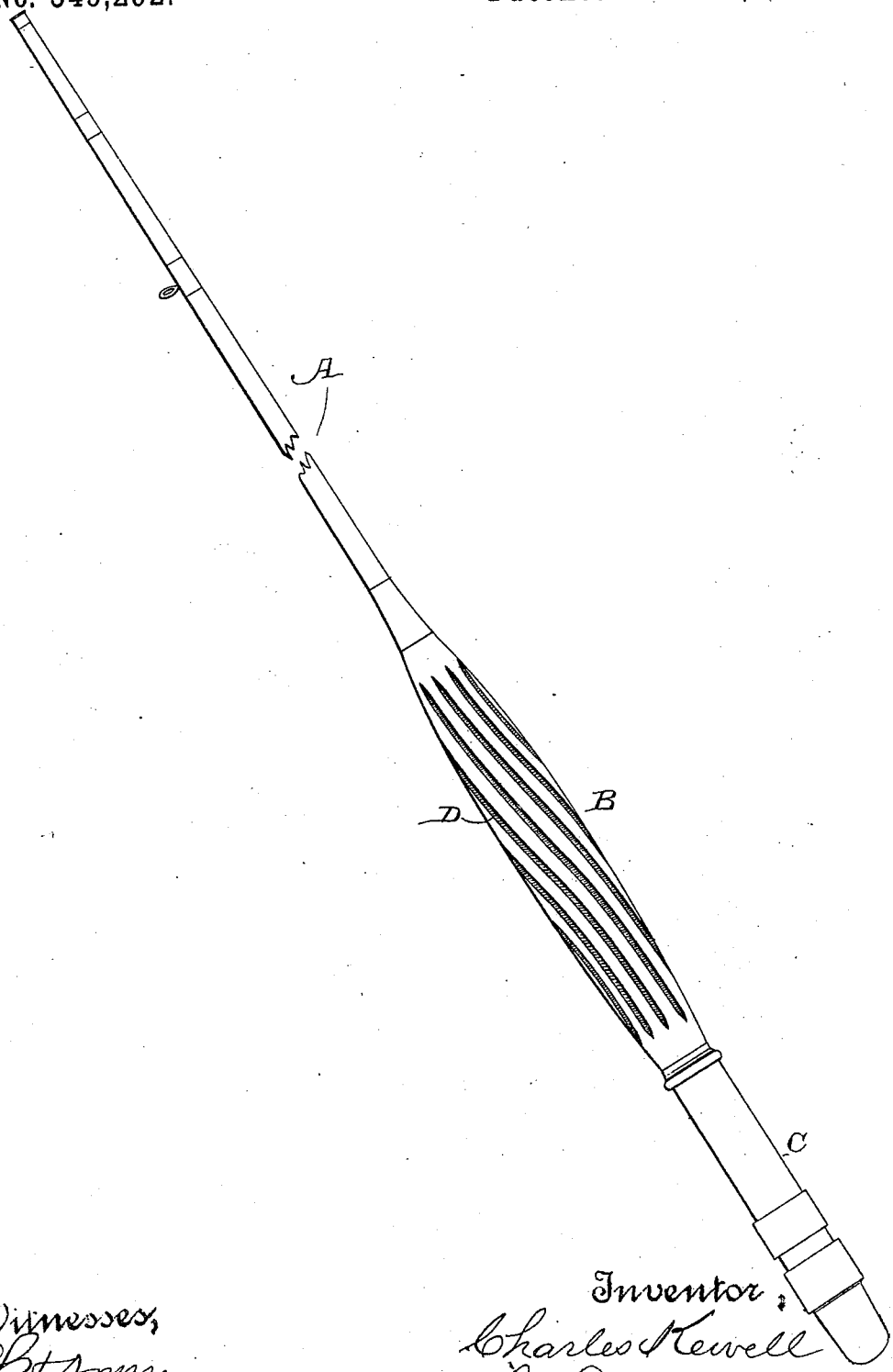

CHARLES KEWELL, OF SAN FRANCISCO, CALIFORNIA.

FISHING-ROD.

SPECIFICATION forming part of Letters Patent No. 549,292, dated November 5, 1895.

Application filed March 6, 1895. Serial No. 540,764. (No model.)

*To all whom it may concern:*

Be it known that I, CHARLES KEWELL, a citizen of the United States, residing in the city and county of San Francisco, State of California, have invented an Improvement in Fishing-Rod Hand-Grips; and I hereby declare the following to be a full, clear, and exact description of the same.

My invention relates to an improvement in fishing-rods; and it consists, essentially, in an improvement in the enlarged grip portion which is held in the hand of the operator.

Referring to the accompanying drawing for a more complete explanation of my invention, the figure represents a portion of a fishing-rod illustrating my invention.

In the ordinary construction of light trout and salmon rods the rod itself is variously made of split bamboo laid up in sections, the whole rod being made up in lengths, with suitable joints by which these lengths are connected together, and the body of the rod is made small and solid. The portion which is held in the hand is usually in the form of an oblong enlarged portion of sufficient length to be easily seized in the hand, and having a very much larger diameter than the remainder of the rod. From the rear of this grip extends a portion C, which is adapted for the attachment of the reel.

The part A of the rod is made in the usual form. The grip or handle portion B is made hollow and has formed in it, preferably, a series of openings or slits D for the circulation of air, which makes it cooler and more convenient for the hand of the user. It also lightens this portion of the rod and in other ways makes it more convenient and acceptable for use. This enlarged handle may be made of any suitable or desired material which is capable of being made hollow and perforated or slotted for ventilating purposes.

I do not claim, broadly, a hollow or ventilated handle, as I am aware that stove-hooks and other articles have been made in this manner.

Having thus described my invention, what I claim as new, and desire to secure by Letters Patent, is—

As an article of manufacture, a fishing rod comprising the solid rod sections A, the reel section and the intermediate grip portion made hollow and provided with slots or perforations.

In witness whereof I have hereunto set my hand.

CHAS. KEWELL.

Witnesses:
S. H. NOURSE,
WM. F. BOOTH.